INVENTORS:
Kenneth G. Lytton,
Cecil S. Wise,
BY Cushman, Darby & Cushman
ATTORNEYS.

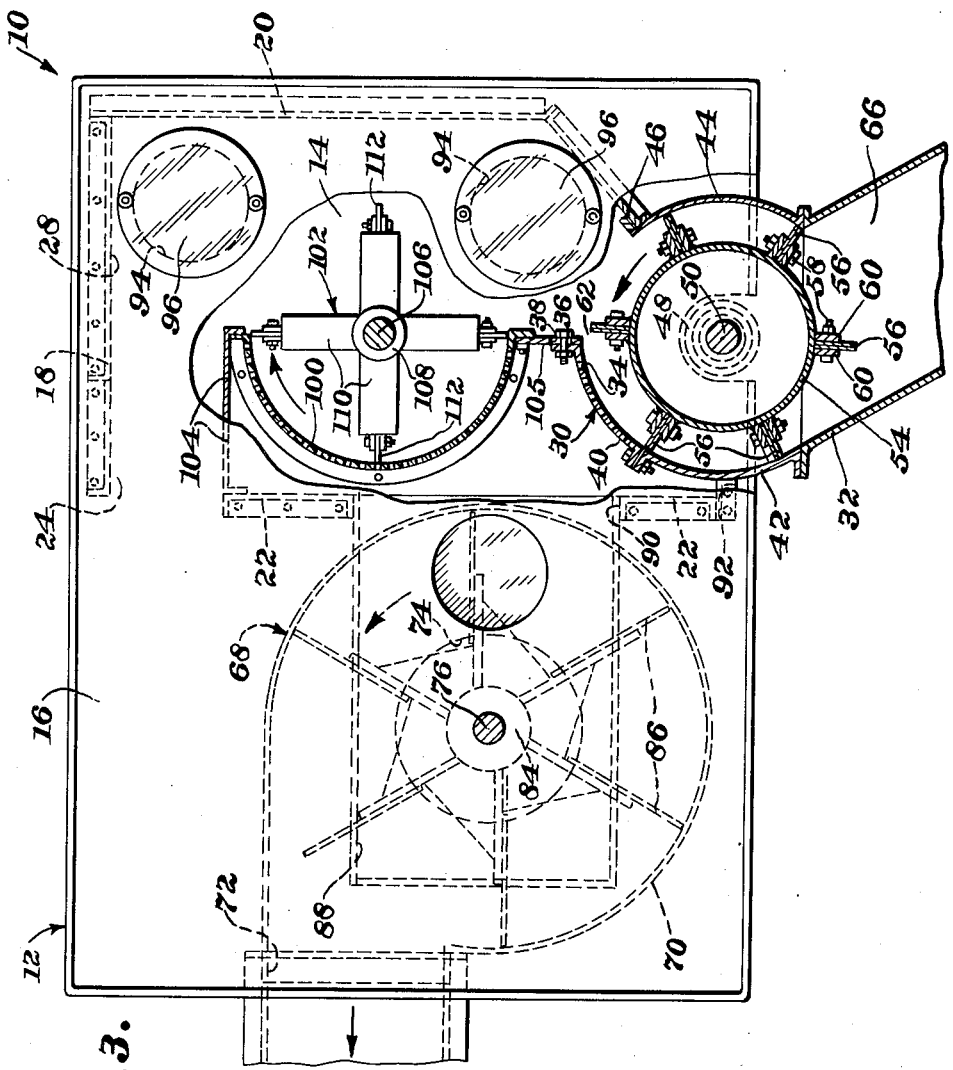

United States Patent Office 3,039,149
Patented June 19, 1962

3,039,149
FIBER CONDENSER
Kenneth G. Lytton, Gastonia, and Cecil S. Wise, Dallas, N.C., assignors to Fiber Controls Corporation, Gastonia, N.C., a corporation of North Carolina
Filed Apr. 24, 1957, Ser. No. 654,735
16 Claims. (Cl. 19—203)

This invention relates to the separation of cotton or other fibrous materials from a stream of air in which it is being conveyed and more particularly to an improved apparatus and procedure for effecting such separation.

In textile mills, there are many instances in which it is necessary to convey fibers from one processing system to another and this is generally done by entraining the fibers in an air stream. In order to separate the fibers from the air stream at the point of delivery, an apparatus, conventionally termed "a fiber condenser," is employed to separate the fibers out of the conveying air stream. The conventional condensers used heretofore have embodied a rotary screen disposed in the air stream path so as to interrupt the movement of the fibers therewith. A rotary doffer is generally provided for cooperative movement relative to the surface of the rotating screen in order to remove the fibers deposited thereon. The conventional apparatus embodying rotary screens have certain disadvantages. Primarily, in the normal use of the rotary screen, the flow of air is radially through the screen and then axially outwardly therefrom to discharge. Consequently, it was necessary to enclose a large portion of the periphery of the rotary screen and such enclosure forms a dead air space where lint and other residue collected. Hence, the conventional apparatus required frequent cleaning to prevent contamination when running subsequent blends of fibers.

Accordingly, it is an object of the present invention to provide an apparatus for separating fibers from an entraining air stream including stationary screening means operable to permit the passage of air directly therethrough so as to eliminate the formation of any dead air spaces tending to collect lint and other residue.

A further object of the present invention is the provision of an apparatus of the type described having stationary screening means embodied therein and an improved rotary doffer cooperating therewith to effectively remove the fibers collected thereon.

Still another object of the present invention is the provision of an apparatus of the type described embodying a unitary construction including means for creating the air stream to convey the fibers, stationary screening means for interrupting the movement of the fibers with the air stream and rotary doffer means for effectively removing the collected fibers from the screening means.

Still another object of the present invention is the provision of an apparatus of the type described having a pair of stationary screens mounted in parallel across the fiber entraining air stream and having rotary doffer means cooperating therewith so that the majority of the fibers will be collected on one of the screens and the majority of the air will pass through the other screen.

Still another object of the present invention is the provision of an apparatus of the type described having novel cooperation between the rotary doffer and the stationary screen which collects the fibers across substantially the entire width of the air stream and effectively removes the same so as to prevent clogging.

Still another object of the present invention is the provision of an apparatus of the type described which may be conventionally mounted in suspended relation from the ceiling of a textile mill in any one of a plurality of positions so as to accommodate different physical conditions as required.

Still another object of the present invention is the provision of a novel procedure for separating the fibers from a conveying air stream which embodies critical flow rates through a screening means and critical doffing speeds to remove the fibers from the screen.

Still another object of the present invention is the provision of an apparatus of the type described which is simple in construction, effective in operation, and economical to manufacture and maintain.

These and other objects of the present invention will become more apparent during the course of the following detailed description and appended claims.

The invention may best be understood with reference to the accompanying drawings wherein illustrative embodiments are shown.

In the drawings:

FIGURE 3 is a view similar to FIGURE 2 illustrating a modified apparatus embodying the principles of the present invention.

Figure 1:
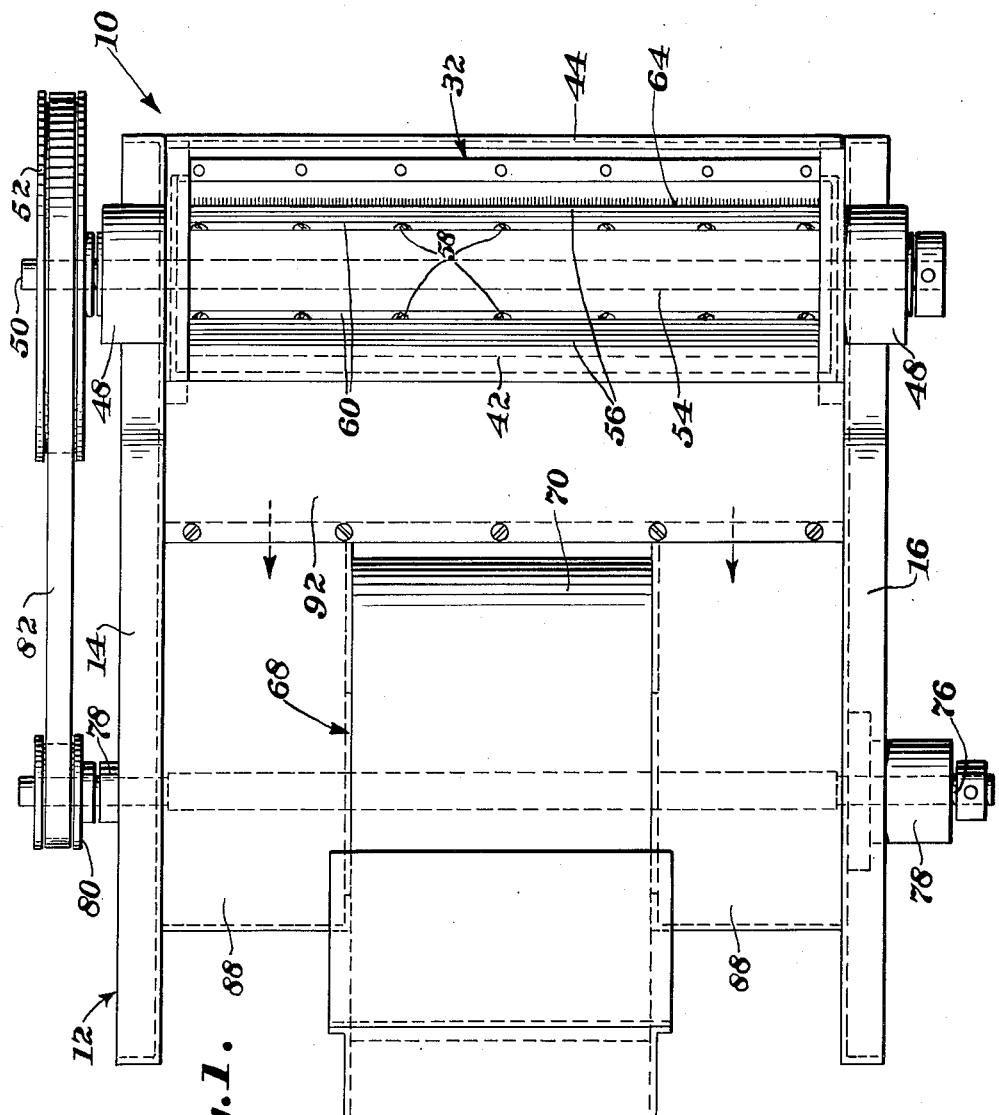
FIGURE 1 is a bottom plan view of an apparatus embodying the principles of the present invention.
Figure 2:
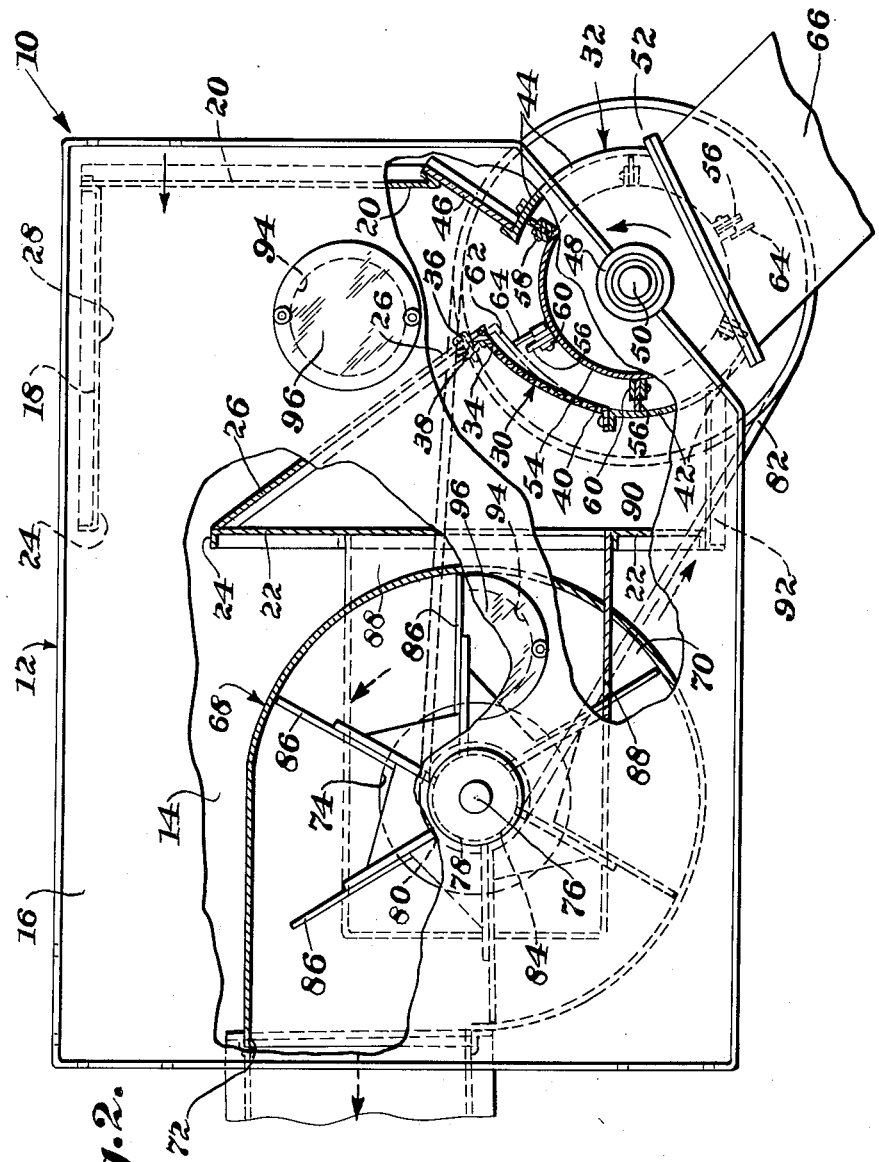
FIGURE 2 is a side elevational view of the apparatus shown in FIGURE 1, with certain parts broken away for purposes of clearer illustration.

Referring now more particularly to FIGURES 1 and 2, there is shown a fiber condenser apparatus, generally indicated at 10, embodying the principles of the present invention. The apparatus includes a housing, generally indicated at 12, indicating a pair of spaced substantially rectangular, side walls 14 and 16. Extending between the side walls along the upper edges is a top wall 18 and a rear vertical wall 20 is mounted between the side walls 14 and 16 at the rear end thereof and extends downwardly from the rear end of the top wall 18. Disposed within the central portion of the housing and extending between the side walls 14 and 16 is a vertical wall 22, the upper end of which is spaced vertically below the top wall 18 to provide an inlet 24 for the entry of fibers entrained in an air stream. Extending downwardly and rearwardly from the upper end of the vertical wall 22 is an inclined wall 26 which, together with the top wall 18 and rear wall 20 and side walls 14 and 16, define a fiber entraining air stream, conveying chamber 28.

Disposed at the discharge end of the chamber 28 is a stationary screen, generally indicated at 30, having a rotary doffer, generally indicated at 32, mounted in cooperating relation therewith. The screen 30 is preferably arcuate in configuration, having its concave surface facing the discharge end of the conveying chamber 28. Any suitable construction may be employed in forming the screen. However, it is preferable to use a metal plate having a series of perforations formed therein. The screen 30 extends substantially throughout the width of the air stream between the side walls 14 and 16 and includes a leading end portion 34 adjustably secured to the lower end of the inclined wall 26. To effect this securement, the leading end portion 34 is bent forwardly in a position substantially parallel with the inclined wall 26 and is apertured to receive bolts 36. Preferably, the lower end of the wall 26 is provided with elongated slots or the like 38 through which the bolts 36 extend. It will be understood that by tightening the bolts 36 in different positions within the elongated slots 38, the leading end portion 34 of the screen 30 can be secured in different positions of adjustment toward and away from the rotary doffer 32. The screen 30 also includes a trailing end portion 40 rigidly secured by any suitable means to the leading end of a discharge doffer casing section 42. An oppositely disposed inlet doffer casing section 44 is secured between the side walls 14 and 16 and has one end interconnected with the lower end of the rear wall 20 by a forwardly and downwardly extending short inclined wall 46.

The rotary doffer 32 is suitably journaled in the housing between the side walls 14 and 16, as by bearings 48, and includes a shaft 50 mounted in the bearings and having a suitable driving pulley 52 fixed to an outwardly extending end thereof. Secured to the shaft 50, as by welding or the like, is a cylindrical drum 54 which forms the hub of the doffer 32 and has a plurality of circumferentially spaced radially extending doffing blades 56 extending outwardly therefrom. The doffing blades 56 are made of a flexible material, such as leather or the like, and are secured to the drum by any suitable means, such as bolts 58, extending between spaced flanges 60 rigidly secured to the periphery of the drum and extending outwardly therefrom.

As best shown in FIGURE 2, the outer tip of each blade 56 is disposed from the axis of rotation of the doffer a substantially equal distance so that they will rotate in a common circular path of travel. The interior surfaces of the doffer casing sections 42 and 44 are disposed within this circular path of travel and each has an arcuate extent greater than the arcuate distance between two adjacent blade tips. The trailing end 40 of the screen 30 is coextensive with the adjacent end of the casing section 42 and is, therefore, also disposed in the circular path of travel of the blades. However, the leading end portion 34 of the screen is spaced outwardly from this path of travel to provide a throat 62 through which the fiber entraining air stream is directed as it leaves the conveying chamber 28. In this manner, the entire air stream with the fibers entrained therein is directed through the screen 30 and the doffer 32 is rotated in a counterclockwise direction, as viewed in FIGURE 2, to assist in so directing the air stream.

The fibers which collect on the screen as they pass through the throat 62 are doffed or removed from the screen by the operation of the doffing blades 56. In order to more effectively doff the fibers from the screen 30, the doffer 32 may be provided with a pair of diametrically opposed nylon brushes 64, which are secured to the drum 54 and extend radially outwardly therefrom beyond the tips of the blades 56. Preferably, the brushes 64 are constructed so that they provide ample perforations or openings therethrough so that they do not appreciably restrict the air flow through the throat 62 when they pass therethrough. The brushes 64, therefore, serve to contact the concave surface of the screen 30 substantially throughout the same from the leading end portion 34 to the trailing end portion 40 so as to insure a thorough removal of the fibers collecting thereon.

In order to direct the fibers separated from the air stream by the doffer 32 to a suitable discharge point for further processing, a guide tube 66 is suitably secured to the outwardly extending ends of the casing sections 42 and 44. The guide tube may be a simple rectangular duct and is preferably inclined at an angle of at least 45° so that the fibers therein will be directed to the discharge point substantially by gravity. That is, since the casing sections 42 and 44 have an arcuate extent greater than the arcuate distance between adjacent doffing blades, the blades do not having a substantial air transferring effect. That is, each doffing blade seals the air from the screen 30 when it reaches the leading end of the discharge casing section 42 so that the fibers are forced out with a minimum of entrained air. Likewise, when the doffing blades pass the inlet casing section 44, only the air between adjacent blades is taken and thus preventing excess air from entering the chamber 28, which may detrimentally affect the air stream therein.

The condenser apparatus 10 of the present invention has mounted in the housing 12 thereof, as a unit, a fan assembly, generally indicated at 68. Preferably, the fan assembly 68 includes a centrally disposed cylindrical casing 70 having a tangentially directed outlet opening 72 and opposed axial inlet openings 74. Extending through the openings 74 is a fan shaft 76 having its opposite ends journaled in bearings 78 mounted on side walls 14 and 16. A pulley 80 is mounted on one of the outwardly extending ends of the shaft 76 and is drivingly connected with the doffer pulley 52, as by a belt 82 or the like. Fixedly secured to the central portion of the shaft 76 within the casing 70 is a fan rotor 84 having a plurality of circumferentially spaced substantially radially extending blades 86.

Mounted between each of the side walls 14 and 16 and the adjacent side wall of the fan casing 70 is a rectangular duct 88, the forward end of which communicates with the associated fan casing inlet 74. The rear end of each duct 88 is open and extends to the vertical wall 22. The latter is provided with openings 90 within which the open rear ends of the ducts 88 are secured so that they communicate with the convex surface of the screen 30. In order to enclose the space on the convex side of the screen, a horizontal bottom wall 92 is secured between the side walls 14 and 16 and between the lower end of the vertical wall 22 and the casing section 42. If desired, the side walls 14 and 16 may be provided with access openings 94 which are normally covered by suitable cover plates 96.

*Operation of Embodiment of FIGURES 1 and 2*

In the normal operation of the condenser apparatus 10, the inlet 24 will be suitably connected to the delivery end of the pipe or conduit leading from a source of fibrous supply, as for example, an opening room in a textile mill. In addition, the guide tube 66 will lead to a delivery station, as for example, a picker hopper or the like. The fan assembly 68 of the present apparatus is capable of creating the air stream within which the fibers at the opening room are entrained so as to be conveyed and ultimately transferred to the guide tube 66. The air stream enters the condenser 10 through inlet 24 with the fibers entrained therein, passes through the conveying chamber 28 and into the throat 62 where the fibers are separated from the entraining air stream by the cooperation of the screen 30 and the doffer 32. The air stream, which also may contain dust, lint and other small particles of foreign matter, such as pepper, leaf stems, etc., separated from the fibers by the screen and doffer, then passes into the space on the concave side of the screen defined by inclined wall 26, vertical wall 22, bottom wall 92, discharge doffer casing section 42 and side walls 14 and 16. From this space, the air passes into the rear open end of each duct 88 and then into the fan assembly through the axial inlets 74 and, finally, out the discharge opening 72. Of course, a conduit may be connected to the discharge opening so as to deliver the air stream at any desired discharge point.

The present invention involves a novel procedure for effecting the separation of the entrained fibers from the air stream and to this end, the rate of air flow through the screen 30 must be at a minimum of approximately 700 cubic feet per minute. Thus, to effect this rate of air flow, the fan assembly 68 must be rotated accordingly. A preferred optimum air flow rate is of the order of 1500 cubic feet per minute through the screen 30. In conjunction with the rate of air flow through the screen, the fibers must be removed therefrom at a minimum linear speed of approximately 880 feet per minute, which is the linear tip speed of the blades for the rotary doffer shown, when rotated at approximately 240 r.p.m. A preferred optimum removal speed is approximately 1500 feet per minute, which corresponds to a doffer rotational speed of approximately 415 r.p.m.

The adjustment of the leading end portion of the screen toward and away from the circular path of travel of the doffing blades is significant in handling fibers of varying characteristics. For example, when running short staple fibers, a relatively close setting is desirable, whereas a greater space is desirable when running long staple fibers. In actual practice, the leading end portion of the screen is adjusted between a minimum spacing of approximately ⅜ of an inch to a maximum spacing of approximately 1¼ inches.

The position of the screen 30 relative to the direction of travel of the air stream and the circular path of travel of the doffing blades 56 or the provision of throat 62 is such that the fibers tend to collect toward the trailing end of the screen where they are easily doffed as the rapidly moving doffing blades move thereby. Each doffing blade seals the air in the throat 62 from the screen 30 when it reaches the leading end of the casing section 42 and thus forces the fiber into the guide tube 66 with only the air between adjacent blades surrounding the doffed fibers. That is, since the casing section 42 has an arcuate extent greater than the arcuate distance between adjacent blades, the fan effect of such blades is considerably reduced so that there is very little tendency for the doffer blades to pull air from the air stream along with the doffed fibers. Conversely, the inlet casing section 44 has a like arcuate extent so that there is little tendency to take in air other than that between adjacent blades which would enter the air stream in the discharge end of chamber 28. In addition, the rotation of the doffer 32 has a tendency to pull the fibers from the concave surface of the screen and out past the casing section 42 with the air between adjacent blades thereof. In this manner, operating at the minimum rate of flow and linear doffing speed noted above, a highly efficient separation of the fibers from the air stream is obtained.

The apparatus is quite simple and with the fan illustrated is capable of picking up fibers from a distance of over 100 feet from the inlet 24 and separating them out. The apparatus is of unitary construction embodying therein the fan assembly for creating the air stream and a rotary doffer driven therewith for separating the fibers by doffing them from a stationary screen extending substantially throughout the width of the air stream created. The apparatus is versatile in that it may be readily operated in the position shown in FIGURE 2 or with the end of the housing 12 adjacent the discharge opening 72 disposed upwardly, or any position intermediate the two positions mentioned above. Since there are no dead air spaces provided, the apparatus is self-cleaning and the danger of contamination is running successive fibers of different characteristics is eliminated without the necessity of habitual cleaning.

Referring now more particularly to FIGURE 3, there is shown a modified apparatus embodying the principles of the present invention. The apparatus of FIGURE 3 is similar to that disclosed in FIGURES 1 and 2 in many aspects, which are indicated by reference numerals corresponding to those already described, and differs therefrom mainly in the provision of a second stationary screen 100 and cooperating rotary doffer 102 mounted within the housing in the air stream path parallel with the screen 30 and doffer 32. To this end, the inclined wall 26 of the embodiment of FIGURES 1 and 2 is eliminated and replaced by a short upper horizontal wall 104 extending rearwardly from the upper end of the vertical wall 22. The rear end of the horizontal wall 104 is rigidly secured to the upper end of the screen 100, which preferably is of semi-cylindrical configuration. The lower end of the screen 100 is rigidly secured to the upper end of a short vertical wall 105 having its lower end adjustably connected with the leading end portion 34 of the screen 30. The doffer 102 includes a shaft 106 suitably journaled in the side walls 14 and 16. Mounted on the shaft 106 between the side walls is a hub 108 having a series of circumferentially spaced radially extending arms 110 rigidly secured thereto. Mounted on the outer end of each arm, by any suitable means, is a doffing brush 112 similar to the doffing brushes 64 previously described. The concave semi-cylindrical surface of the screen 100 is disposed in the circular path of travel of the tips of the brushes 112 and the doffer is rotated in a clockwise direction, as viewed in FIGURE 3, so that the air and fibers entering inlet 24 will be assisted to move toward the throat 62 by the rotation of the doffer 102 rather than to be immediately pulled into the screen 100, as would be the case if the doffer were rotated in a counterclockwise direction, as viewed in FIGURE 3.

*Operation of Embodiment of FIGURE 3*

As briefy indicated above, the stream of air and entrained fibers created by the fan assembly 68 enters the conveying chamber 28 through inlet 24. The clockwise rotation of the doffer 102 assists in directing the stream of air, and particularly the fibers, toward the throat 62. It has been found that the operation of the rotary doffer 102 is such that the majority of the air in the stream passing through the conveying chamber 28 will pass through the stationary screen 100. In normal operation, approximately 70% of the air entering inlet 24 will pass through the screen 100. Of particular significance, however, is the fact that the operation of the doffer 102 also serves to direct a majority, if not substantially all, of the entrained fibers toward the throat 62 so that they will be collected on the screen 30 and doffed therefrom by the doffer 32. The latter operates in the same manner as indicated above in relation to the embodiment of FIGURES 1 and 2. Those fibers which are collected on the screen 100 are doffed therefrom by the operation of the doffer 102 and again entrained within the air stream within the conveying chamber 28 so that ultimately all of the fibers are collected on the screen 30 and discharged into the guide tube 66.

The significance of the embodiment shown in FIGURE 3 is that a much greater total air flow rate can be employed, which enables the fibers to be moved a much greater distance than is possible with the embodiment of FIGURES 1 and 2. For example, the apparatus of FIGURE 3 is capable of picking up fibers from a distance in excess of 450 feet. Since a majority of the air passes through screen 100 and since the latter is in parallel in the air stream with the screen 30, this greater air flow rate does not appreciably affect the rate of flow through the screen 30. That is, in normal operation, approximately 70% of the air flow will pass through the screen 100, which means that for a minimum air flow of 700 cubic feet per minute through the screen 30, the total air flow through both screens is approximately 2300 cubic feet per minute. For the optimum rate of flow through the screen 30 of 1500 cubic feet per minute, a total flow rate through both screens would be in the neighborhood of 3500 cubic feet per minute.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A condenser for screening fibers out of an air stream comprising: housing means including a doffer chamber; inlet duct means in said housing means communicating with said doffer chamber for receiving a fiber laden air stream; air exhaust duct means in said housing in communication with said doffer chamber; a stationary screen carried by said housing across said air exhaust duct means adjacent said doffer chamber, said screen constructed and arranged to substantially block passage of fibers therepast; a rotary doffer mounted in said doffer chamber adjacent said inlet duct means and said screen and having a plurality of circumferentially spaced doffing blades, said blades having tips spaced equi-distant from the axis of rotation of said doffer so as to travel the same circular path, said screen terminating in a leading end portion spaced outwardly from said circular path of travel of said doffing blade and a trailing end portion disposed in said circular path of travel so that the fibers accumulating thereon will be stripped therefrom by said rotary doffer and fiber exhaust duct means in said housing communicating with said doffer chamber angularly beyond said screen trailing edge with respect to the direction of rotation of said rotary doffer, to collect substantially all the fibers blocked by said screen.

2. A condenser as defined in claim 1 wherein said screen is concave.

3. A condenser as defined in claim 1 wherein the leading end portion of said screen has means connected therewith for adjustably moving the same toward and away from said circular path of travel.

4. A condenser as defined in claim 1 wherein said doffer includes opposed brushes extending radially beyond said blade tips.

5. A condenser as defined in claim 1 wherein said housing carries a second stationary screen disposed in communication with said inlet duct means in parallel with said first mentioned screen, and wherein a second rotary doffer is carried by said housing for cooperation with said second screen, said second doffer being rotatable in an opposite direction from said first mentioned doffer so that a majority of the fibers are collected on said first mentioned screen and a majority of the air passes through said second screen.

6. A condenser for screening fibers and the like out of an air stream comprising a housing having means therein for directing the air stream along a predetermined path, a stationary screen carried by said housing in a position to extend across said air stream path, a rotary doffer carried by said housing adjacent said screen and having a plurality of circumferentially spaced doffing blades of substantially equal radial extent, an arcuate discharge doffer casing section carried by said housing in the path of movement of said doffing blades and having an arcuate extent greater than the arcuate distance between adjacent doffing blade tips, an arcuate intake doffer casing section carried by said housing in the path of movement of said doffing blades in spaced relation to said discharge section and having an arcuate extent greater than the arcuate distance between adjacent doffing blade tips, said stationary screen having a leading end portion disposed in spaced relation to the path of travel of said doffing blades and terminating in a trailing end substantially coextensive with the leading end of said discharge doffer casing section, the leading end portion of said screen and the trailing end portion of said inlet doffer casing section defining an inlet throat for said doffer and said screen in said air stream path, said throat and said screen being substantially co-extensive with said doffer in an axial direction with respect to the latter.

7. A condenser as defined in claim 6 wherein the leading end portion of said screen has means connected therewith for adjustably moving the same toward and away from said circular path of travel.

8. A condenser as defined in claim 6 wherein said doffer includes opposed brushes extending radially beyond said blade tips.

9. A condenser as defined in claim 6 wherein said housing carries a second stationary screen disposed in said air stream path in parallel with said first mentioned screen, and wherein a second rotary doffer is carried by said housing for cooperation with said second screen, said second doffer being rotatable in an opposite direction from said first mentioned doffer so that a majority of the fibers are collected on said first mentioned screen and a majority of the air passes through said second screen.

10. A condenser for screening fibers and the like out of an air stream comprising a housing, a fan casing carried by said housing and having opposed axial intake openings and a tangential outlet opening, a fan journaled in said fan casing, a pair of laterally spaced ducts carried by said housing in communication with said intake openings, means carried by said housing defining an air and fiber intake and an air stream path between said intake and said ducts, a stationary screen carried by said housing in a position to extend across said air stream path for interrupting the movement of the fibers with said air stream, a rotary doffer carried by said housing adjacent said screen and having a plurality of circumferentially spaced doffing blades, said blades having tips spaced equidistant from the axis of rotation of said doffer so as to travel in the same circular path, opposed doffer casing sections carried by said housing in said circular path of travel, each of said sections having an arcuate extent greater than the arcuate distance between adjacent doffing blade tips, said screen having a leading end portion spaced from the circular path of travel of said blade tips and a trailing end coextensive with one of said doffer casing sections in said circuit path of travel, said leading end portion being spaced from the other of said doffer casing sections and defining therewith an inlet throat for said doffer and said screen in said air stream path, said throat and said screen being substantially co-extensive with said doffer in an axial direction with respect to the latter.

11. A condenser as defined in claim 10 wherein the leading end portion of said screen has means connected therewith for adjustably moving the same toward and away from said circular path of travel.

12. A condenser as defined in claim 10 wherein said doffer includes opposed brushes extending radially beyond said blade tips.

13. A condenser as defined in claim 10 wherein said housing carries a second stationary screen disposed in said air stream path in parallel with said first mentioned screen, and wherein a second rotary doffer is carried by said housing for cooperation with said second screen, said second doffer being rotatable in an opposite direction from said first mentioned doffer so that a majority of the fibers are collected on said first mentioned screen and a majority of the air passes through said second screen.

14. A condenser as defined in claim 10 wherein said opposed doffer casing sections are connected with a downwardly extending gravity flow fiber conduit.

15. A condenser for screening fibers and the like out of an air stream comprising a housing having means therein for directing the air stream along a predetermined path, a first stationary screen carried by said housing in said air stream path, a first rotary doffer carried by said housing for cooperation with said first screen, a second stationary screen carried by said housing in said air stream path in parallel with said first screen, a second rotary doffer carried by said housing adjacent said first doffer for cooperation with said second screen, said rotary doffers being rotatable in opposite directions so that the majority of the fibers are directed to said second screen and the majority of the air passes through said first screen.

16. A method of separating fibers and the like entrained in an air stream which comprises directing the fiber entraining air stream in parallel through adjacent stationary screens, doffing the fibers from one screen so that a majority of the fibers will be collected on the other screen and a majority of the air will pass through said one screen with a minimum rate of said flow of approximately 700 cubic feet per minute passing through the other screen, and simultaneously doffing the fibers collected on the other screen by a doffer having a minimum linear tip speed of approximately 880 feet per minute.

References Cited in the file of this patent

UNITED STATES PATENTS

| | | |
|---|---|---|
| 1,046,441 | Conrad | Dec. 10, 1912 |
| 1,175,664 | Shute | Mar. 14, 1916 |
| 1,727,128 | Mitchell | Sept. 3, 1929 |
| 1,812,412 | Olson | June 30, 1931 |
| 1,941,124 | Ziegler | Dec. 26, 1933 |
| 2,332,413 | Teague | Oct. 19, 1943 |
| 2,751,633 | Clark | June 26, 1956 |